United States Patent [19]

Yoshida et al.

[11] Patent Number: 5,217,822
[45] Date of Patent: Jun. 8, 1993

[54] SOLID OXIDE ELECTROLYTE TYPE FUEL CELL AND METHOD FOR FABRICATING THE SAME

[75] Inventors: Shizuyasu Yoshida; Hitoshi Shimizu, both of Kawasaki, Japan

[73] Assignee: Fuji Electric Co., Ltd., Kawasaki, Japan

[21] Appl. No.: 755,098

[22] Filed: Sep. 5, 1991

[30] Foreign Application Priority Data

Sep. 10, 1990 [JP] Japan .................................. 2-239313

[51] Int. Cl.⁵ .......................... H01M 8/10; H01M 4/86
[52] U.S. Cl. ........................................ 429/33; 429/40; 427/115; 264/61
[58] Field of Search ................... 429/33, 40; 427/115, 427/380; 264/61

[56] References Cited

U.S. PATENT DOCUMENTS

| | | | |
|---|---|---|---|
| 4,614,628 | 9/1986 | Hsu et al. | 264/61 |
| 4,702,971 | 10/1987 | Isenberg | 429/33 X |
| 4,767,518 | 8/1988 | Maskalick | 429/33 X |
| 4,812,329 | 3/1989 | Isenberg | 429/33 X |
| 5,035,962 | 7/1991 | Jensen | 429/33 X |

OTHER PUBLICATIONS

Proceedings of the 23rd Intersociety Energy Conversion Engineering Conference, vol. 2, Jul./Aug. 1988, pp. 218-219.

*Primary Examiner*—Stephen Kalafut
*Attorney, Agent, or Firm*—Spencer, Frank & Schneider

[57] ABSTRACT

A solid oxide electrolyte type fuel cell includes an anode plate made of a porous sintered material composed essentially of (i) partially stabilized zirconia composed of zirconia and magnesia and (ii) nickel, and a solid oxide electrolyte element superimposed on the anode plate and composed of zirconia stabilized with yttria. The anode plate is fabricated by mixing a powder of zirconia partially stabilized with magnesia and a powder of nickel oxide, molding the mixture, sintering the mixture, and then reducing the sintered body in a reducing atmosphere, e.g., hydrogen. Magnesia is added preferably in the amount of 7 to 10% by mole. Addition of the zirconia partially stabilized with magnesia in an amount of 40 to 70% by weight based on total amount of nickel oxide plus the partially stabilized zirconia results in the coefficient of thermal expansion of the cermet matching that of the zirconia stabilized with yttria to an accuracy of ±5%.

17 Claims, 4 Drawing Sheets

SOLID OXIDE ELECTROLYTE TYPE FUEL CELL AND METHOD FOR FABRICATING THE SAME

BACKGROUND OF THE INVENTION

1. Field of the Invention

The present invention relates to a solid oxide electrolyte fuel cell and to a method for fabricating the same. More particularly, the present invention relates to a solid oxide electrolyte type fuel cell in which a solid oxide electrolyte and an anode plate are matched with respect to their coefficients of thermal expansion and to a method for fabricating such a fuel cell.

2. Description of Related Arts

Generally, fuel cells having a solid oxide electrolyte such as zirconia are operated at a high temperature as high as 800° to 1,100° C. and hence they have various features. For example, their power generation efficiency is high, they require no catalyst, and they are easy to handle because the electrolyte used is solid. Therefore, solid oxide electrolyte fuel cells are viewed as third generation fuel cells.

However, since they are composed mainly of ceramics, the solid oxide electrolyte fuel cells tend to fail thermally, and there is no appropriate means for sealing gases. As a result it has been difficult to realize an acceptable model.

A conventional approach uses a unit cell of a unique form, i.e., a tubular form in order to overcome the aforementioned two problems. This test operation was carried out successfully (cf. 1988 IECEC Proceedings, Vol. 2, p. 218 (1988)). However, power generation density per unit volume of fuel cell is still low and there is no anticipation that an economically advantageous fuel cell can be obtained.

In order to increase the power generation density of a solid oxide electrolyte fuel cell, it is necessary to construct it in a flat plate form. A planar solid oxide electrolyte fuel cell includes a solid electrolyte (dense), an air electrode (porous) on one side of and a fuel electrode (porous) on the other side of the solid electrolyte, and two bipolar plates sandwiching therebetween the air electrode and the fuel electrode, the respective bipolar plates having grooves on both sides thereof for passing reaction gases (cf. 1988 IECEC Proceedings, Vol. 2, p. 218 (1988)).

FIG. 1 is an exploded perspective view showing another type of conventional solid oxide fuel cell. As shown in FIG. 1, a conventional planar solid oxide fuel cell 10 includes an anode plate 12 which has thereon a solid oxide electrolyte element 11, a cathode 13, a cathode plate 14, and a separator 15, superimposed one on another in this order. The anode and cathode plates 12 and 14, respectively, are formed with grooves, and the anode grooves 16 and cathode grooves 17 are perpendicular to each other, and different gases pass through the two groups of grooves 16 and 17.

Conventionally, the anode plate 12 is made of a porous cermet composed of zirconia stabilized with yttria, and the solid oxide electrolyte element 11 is made of zirconia stabilized with yttria. The conventional anode plate 12 has a coefficient of thermal expansion of $12 \times 10^{-6}/°$ C. to $14 \times 10^{-6}/°$ C., and the solid oxide electrolyte element 11 has a coefficient of thermal expansion of $10.5 \times 10^{-6}/°$ C.

This difference in coefficient of thermal expansion between the anode plate 12 and the solid oxide electrolyte element 11 results in the occurrence of curls or cracks in the anode plate 12 and also cracks in the solid oxide electrolyte element 11. This causes cross leaking between a fuel gas and an oxidizer gas, or contact failure which decreases the performance of the fuel cell.

SUMMARY OF THE INVENTION

Under the circumstances, it is an object of the present invention to provide a solid oxide electrolyte fuel cell in which the coefficient of thermal expansion of the anode plate is matched with that of the solid oxide electrolyte element and which is free of curls or cracks and has high performance and high reliability.

It is another object of the present invention to provide a method for fabricating such a fuel cell as described above.

As a result of extensive investigations, it has now been found that the above objects can be achieved by the use of an anode plate composed with both zirconia partially stabilized with magnesia and nickel. The present invention is based on this discovery.

In the first aspect of the present invention, a solid oxide electrolyte fuel cell comprises:

a solid oxide electrolyte element composed of zirconia stabilized with yttria, and an anode plate having laminated thereon the solid oxide electrolyte element, the anode plate being a porous sintered body composed of (i) partially stabilized zirconia composed of zirconia and magnesia, and (ii) nickel.

In the second aspect of the present invention, a solid oxide electrolyte fuel cell comprises:

an anode plate;

a solid oxide electrolyte element provided on the anode plate;

a cathode provided on the solid oxide electrolyte element;

a cathode plate provided on the cathode; and a separator provided on the cathode plate;

wherein the anode plate comprises a porous sintered body composed of:

(i) partially stabilized zirconia composed of zirconia and magnesia, and (ii) nickel, and wherein the solid oxide electrolyte element is composed of zirconia stabilized with yttria, the solid electrolyte element being laminated on the anode plate.

Here, the porous sintered body may contain (i) an amount of 40 to 70% by weight based on total weight of partially stabilized zirconia (ii) plus nickel in the form of nickel oxide.

The partially stabilized zirconia may contain magnesia in an amount of 7 to 10% by mole.

The anode plate may have a porosity of 40 to 50%, and a mean pore diameter of 6 to 10 μm.

The anode plate may have a coefficient of thermal expansion substantially equal to a coefficient of thermal expansion of the solid electrolyte element.

In the third aspect of the present invention, a method for fabricating a solid oxide electrolyte fuel cell, comprises the steps of:

(a) molding a mixture of (i) partially stabilized zirconia composed of zirconia and magnesia and (ii) nickel oxide into an article in the form of an anode plate having a flat surface;

(b) sintering the article to obtain a sintered body;

(c) heating the sintered body in a reducing atmosphere to make an anode plate composed essentially of nickel-zirconia partially stabilized with magnesia and having a flat surface; and (d) providing a solid electrolyte element composed of zirconia stabilized with yttria.

Here, the solid oxide electrolyte element may be laminated on the flat surface of the anode plate. This may occur prior to the heating of the sintered body in a reducing atmosphere. The porous sintered body may contain (i) an amount of 40 to 70% by weight based on total weight of the partially stabilized zirconia (ii) plus nickel in the form of nickel oxide. The partially stabilized zirconia may contain magnesia in an amount of 7 to 10% by mole.

According to the present invention, reduction or heat treatment in a hydrogen atmosphere of a sintered body or cermet composed of (i) zirconia partially stabilized with magnesia (hereafter, abbreviated as "MPSZ") and (ii) nickel oxide, leads to reduction of the nickel oxide alone and as a result a cermet composed of MPSZ and a nickel metal is formed. In this case, by properly selecting the proportion of MPSZ to nickel in the anode plate (or mixing ratio of MPSZ to nickel oxide), the coefficient of thermal expansion of the cermet can be adjusted to a value near the coefficient of thermal expansion of yttria-stabilized zirconia (hereafter, abbreviated as "YSZ"), $10.5 \times 10^{-6}/°C$.

Addition of magnesia (MgO) to zirconia ($ZrO_2$) changes the coefficient of thermal expansion of the zirconia, and this coefficient reaches a minimum level of about $9.0 \times 10^{-6}/°C$. with the content of MgO within the range of 7 to 10% by mole. The coefficient increases outside the range of 7 to 10% by mole. Hence the addition of MPSZ with an MgO content of 7 to 10% by mole to nickel enables matching of the coefficient of thermal expansion of the anode plate with the coefficient of thermal expansion ($10.5 \times 10^{-6}/°C$.) of the YSZ layer or solid electrolyte element even when added in a small amount while maintaining the characteristics and properties such as electroconductivity, gas permeability, etc. of the anode plate.

More particularly, when an MPSZ containing 7 to 10% by mole of magnesia (zirconia partially stabilized with 7 to 10% by mole of magnesia) is mixed with nickel oxide, which has a coefficient of thermal expansion of $14 \times 10^{-6}/°C$., in a proportion of 40 to 70% by weight of MPSZ based on the weight of the mixture, and the mixture is sintered and reduced, the resulting cermet has a coefficient of thermal expansion which corresponds to the coefficient of thermal expansion of the YSZ in an accuracy of ±5%.

Thus, a solid oxide electrolyte fuel cell free of curls or cracks having a high performance and a high reliability can be obtained.

The above and other objects, effects, features and advantages of the present invention will become more apparent from the following description of embodiments thereof taken in conjunction with the accompanying drawings.

DESCRIPTION OF THE PREFERRED EMBODIMENT

Figure 1:
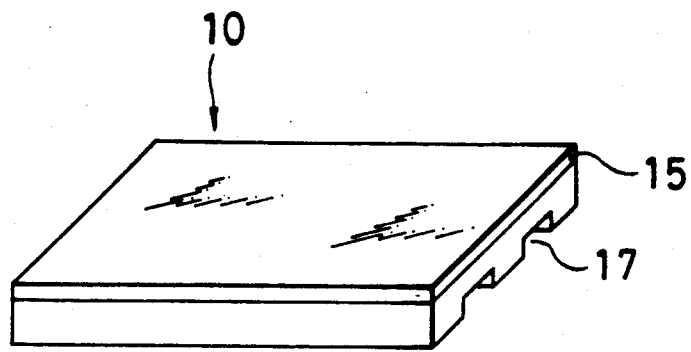
FIG. 1 is an exploded perspective view showing a conventional solid oxide electrolyte fuel cell.
Figure 1:
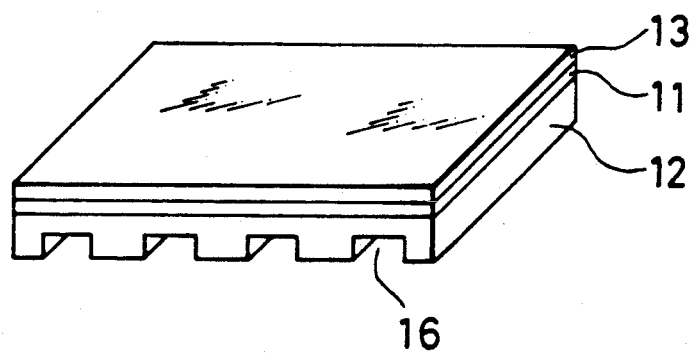
Figure 2:
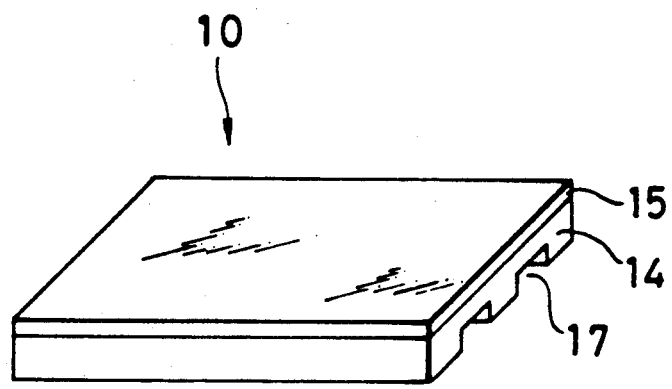
FIG. 2 is an exploded perspective view showing a solid oxide electrolyte fuel cell according to one embodiment of the present invention.
Figure 2:
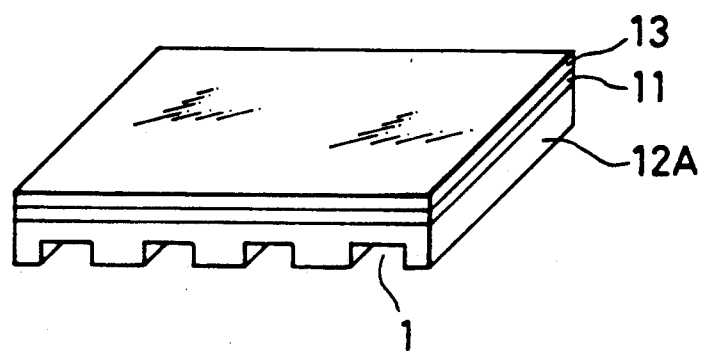

FIG. 2 is an exploded perspective view showing a solid oxide electrolyte fuel cell according to one embodiment of the present invention. A solid oxide electrolyte fuel cell 10 includes a solid oxide electrolyte element 11 composed of zirconia stabilized with yttria (or, YSZ, yttria-stabilized zirconia), a porous anode plate 12A essentially composed of nickel and zirconia partly stabilized with magnesia (MPSZ), the anode plate 12A having an integral portion serving as an anode, a porous cathode 13 composed of lanthanum strontium manganite, La(Sr)MnO$_3$, a porous cathode plate 14 composed of lanthanum strontium manganite, La(Sr)MnO$_3$, and a separator 15 composed of lanthanum chromite, LaCrO$_3$. The solid oxide electrolyte element 11, the cathode 13, the cathode plate 14 and the separator 15 are laminated on the anode plate 12A in this order. The anode plate has formed on its surface opposite to the surface which contacts the solid electrolyte element 11, a plurality of grooves 16 in which a fuel gas flows. Also, the cathode plate is formed with a plurality of grooves 17 in which an oxidizer gas flows on its surface facing the solid electrolyte element 11. After flowing in the grooves 16 and 17, respectively, the reaction gases pass through cavities in the electrode plates 12A and 14, respectively, and are supplied to the solid electrolyte element 11.

In the cathode the following reaction occurs:

$$O_2 + 4e^- \rightarrow 2O^{2-} \qquad (1)$$

On the other hand, on an interface between the anode plate 12A which serves also as an anode and the solid oxide electrolyte element 11, there occurs the following reaction:

$$2O^{2-} + 2H_2 \rightarrow 2H_2O + 4e^- \qquad (2)$$

Oxygen ions $O^{2-}$ flow in the inside of the solid oxide electrolyte element 11 from the cathode 13 toward the anode. Electrons $4e^-$ flow in an outside circuit including the separator 15.

The major difference between the fuel cell of the present invention and the conventional one is in the material of the anode plate.

Figure 3:
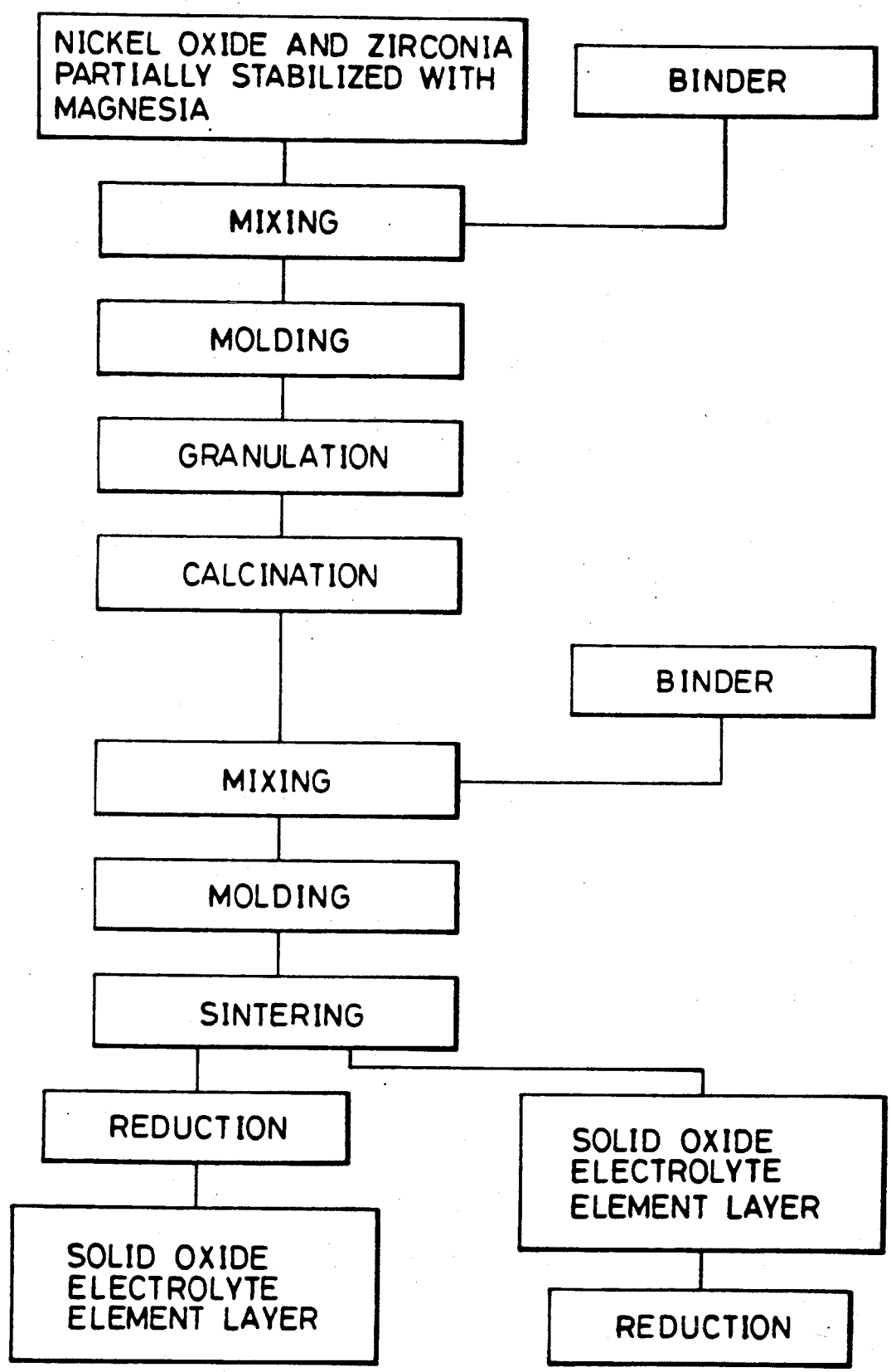
FIG. 3 is a flow-chart illustrating fabrication of a solid oxide electrolyte fuel cell according to one embodiment of the present invention.

The fuel cell of the present invention having the aforementioned construction can be fabricated as described below. FIG. 3 is a flow-chart illustrating the fabrication of a solid oxide electrolyte fuel cell according to one embodiment of the present invention. A fine powder of nickel oxide (NiO) having a mean particle diameter of not greater than 1 μm and fine powder of MPSZ (for example, "TZ-9MG", a trade name for a product by TOSOH Corporation) are provided. The fine powders are weighed and introduced in ethanol to which is added a binder such as a mixture of polyvinyl-butyral (2 to 3% by weight) and polyethylene glycol (0.3 to 0.5% by weight). The resulting mixture is mixed in a wet state. After the wet-mixing, the mixture is left to stand for 12 to 24 hours, and dried by heating at 80° to 100° C. for 2 to 3 hours.

The dry powder composition is charged in a metal mold and pressurized under a predetermined pressure (for example, 1,000 kg/cm$^2$) at room temperature for 1 to 3 minutes to be thereby molded in the form of a disc. The disc-shaped molded product is then crushed by a stamp mill or a cutter mill to give a coarse powder, which is passed through a sieve of 300 μm meshes for granulation. Granulated mixed powder composed of NiO and MPSZ is charged in an alumina crucible and calcined in air at 1,200° to 1,400° C. for 2 hours.

The calcined powder is added to an aqueous solution having dissolved therein polyvinyl alcohol (2 to 3% by weight) and polyethylene glycol (0.3 to 0.5% by weight) as a binder, mixed well, and then dried with heating.

The granulated powder thus obtained is charged in a metal mold and molded at room temperature and at a pressure of 300 to 500 kg/cm$^2$ for 1 to 3 minutes, followed by sintering in air at 1,300° to 1,600° C. for 2 hours to obtain a porous sintered product of NiO and MPSZ having a size of 130 mm in diameter×4 mm in thickness. At sintering temperatures lower than 1,300° C., the sintered product has a considerably reduced strength.

The NiO-MPSZ sintered product is reduced in a hydrogen reduction atmosphere at 600° to 1,000° C. to obtain an anode plate composed of a porous Ni-MPSZ cermet which is electroconductive. The anode plate has a porosity of 40 to 50%, and a mean pore diameter of 6 to 10 μm.

On the porous anode plate 12A fabricated as described above is formed, as a solid oxide electrolyte element, a dense layer of YSZ of 100 μm thick formed by low pressure plasma spraying (LPPS) of YSZ having a particle size of 10 to 44 μm.

The anode plate 12A having formed thereon the solid electrolyte layer as described above is then assembled with the cathode 13, cathode plate 14 and the separator 15 to fabricate a unit cell. The cathode 13, the cathode plate 14 and the separator 15 may be conventional. By repeating the assembly in a plurality of times, a stacked fuel cell system can be obtained.

As a variation of the aforementioned embodiment, a YSZ layer may be formed, for example, by plasma spraying on the sintered anode plate 12A (NiO-MPSZ) prior to its reduction, followed by assembling the resulting anode plate carrying thereon the solid oxide electrolyte layer (YSZ) with other components of the fuel cell to obtain a unit cell. A fuel cell stack can be obtained by repeating the assembling in a plurality of times. The reduction of the anode plate can be performed by heating the fuel cell stack at a cell operating temperature, e.g., at 800° to 1,100° C. and introducing a fuel gas such as hydrogen or the like into the cells to convert NiO-MPSZ to Ni-MPSZ. In this case no curl or crack occurs in the anode plate 12A (before reduction) when low pressure plasma spraying (LPPS) of YSZ is performed thereon.

Figure 4:
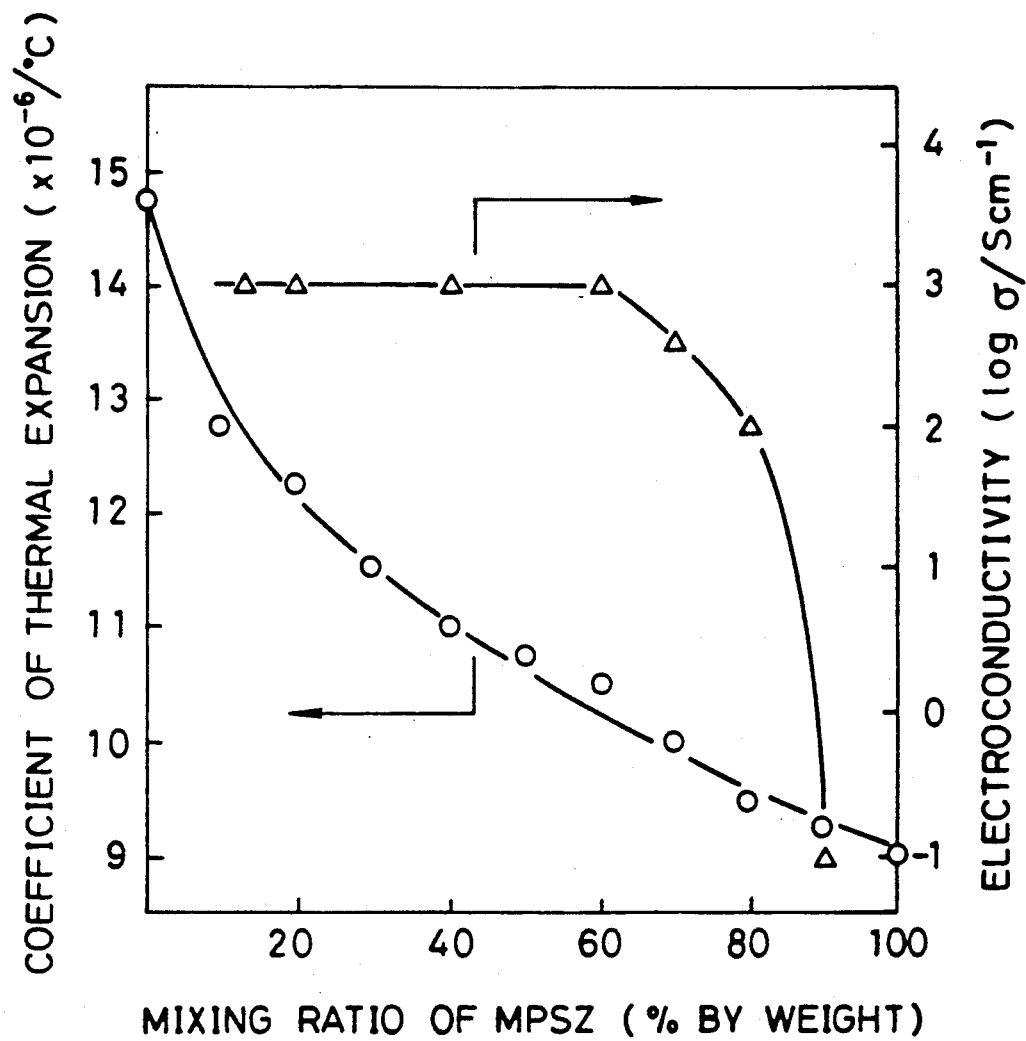
FIG. 4 is a graph illustrating dependence on the MPSZ mixing ratio of the coefficient of thermal expansion and the electroconductivity of an anode plate in a solid oxide electrolyte fuel cell according to one embodiment of the present invention.

FIG. 4 is a graph illustrating dependence on the MPSZ mixing ratio of the coefficient of thermal expansion and the electroconductivity of NiO-MPSZ sintered product after reduction (NiO-MPSZ) with hydrogen. In FIG. 4, symbols "o" (circles) indicate the coefficient of thermal expansion of the cermet (10$^{-6}$/°C.) while symbols "Δ" (triangles) indicate the electroconductivity of the cermet (log α/Scm$^{-1}$).

When the mixing ratio of MPSZ is 40 to 70% by weight based on total weight of NiO plus MPSZ, the coefficient of thermal expansion of the anode plate matches that of YSZ constituting the solid oxide electrolyte element to an accuracy of within±5%. Also, in that range, the cermet has a high electroconductivity. In the present invention, there is used MPSZ containing MgO as a solid solution in an amount of 7 to 10% by mole.

The invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A solid oxide electrolyte fuel cell comprising:
   a solid oxide electrolyte element comprising zirconia stabilized with yttria, and
   an anode plate having laminated thereon said solid oxide electrolyte element, said anode plate being a porous sintered body comprising
   (i) partially stabilized zirconia comprising zirconia and magnesia, and
   (ii) nickel.

2. A fuel cell as claimed in claim 1, wherein said porous sintered body contains (i) an amount of 40 to 70% by weight based on total weight of said partially stabilized zirconia; and (ii) said nickel in the form of nickel oxide.

3. A fuel cell as claimed in claim 1, wherein said partially stabilized zirconia contains magnesia in an amount of 7 to 10% by mole.

4. A fuel cell as claimed in claim 1, wherein said anode plate has a porosity of 40 to 50%, and a mean pore diameter of 6 to 10 μm.

5. A fuel cell as claimed in claim 1, wherein said anode plate has a coefficient of thermal expansion substantially equal to a coefficient of thermal expansion of said solid electrolyte element.

6. A solid oxide electrolyte fuel cell comprising:
   an anode plate;
   a solid oxide electrolyte element laminated on said anode plate;
   a cathode provided on said solid oxide electrolyte element;
   a cathode plate provided on said cathode; and
   a separator provided on said cathode plate;
   wherein said anode plate comprises a porous sintered body comprising:
   (i) partially stabilized zirconia comprising zirconia and magnesia; and
   (ii) nickel, and
   wherein said solid oxide electrolyte element is comprised of zirconia stabilized with yttria.

7. A fuel cell as claimed in claim 6, wherein said porous sintered body contains (i) an amount of 40 to 70% by weight based on total weight of said partially stabilized zirconia; and (ii) said nickel in the form of nickel oxide.

8. A fuel cell as claimed in claim 6, wherein said partially stabilized zirconia contains magnesia in an amount of 7 to 10% by mole.

9. A fuel cell as claimed in claim 6, wherein said anode plate has a porosity of 40 to 50%, and a mean pore diameter of 6 to 10 μm.

10. A fuel cell as claimed in claim 6, wherein said anode plate has a coefficient of thermal expansion substantially equal to a coefficient of thermal expansion of said solid electrolyte element.

11. A method for fabricating a solid oxide electrolyte fuel cell, comprising the steps of:
   (a) molding a mixture of (i) partially stabilized zirconia composed of zirconia and magnesia and (ii) nickel oxide into an article in the form of an anode plate having a flat surface;
   (b) sintering said article to obtain a sintered body;
   (c) heating said sintered body in a reducing atmosphere to make an anode plate composed essentially of nickel-zirconia partially stabilized with magnesia and having a flat surface; and
   (d) laminating onto said anode plate a solid electrolyte element composed of zirconia stabilized with yttria.

12. A method as claimed in claim 11, wherein said solid oxide electrolyte element is laminated on said flat surface of said anode plate.

13. A method as claimed in claim 12, wherein said porous sintered body contains (i) an amount of 40 to 70% by weight based on total weight of said partially stabilized zirconia; and (ii) said nickel in the form of nickel oxide.

14. A method as claimed in claim 12, wherein said partially stabilized zirconia contains magnesia in an amount of 7 to 10% by mole.

15. A method as claimed in claim 11, wherein said solid electrolyte element is laminated on said flat surface of said anode plate prior to said heating said sintered body in a reducing atmosphere.

16. A method as claimed in claim 15, wherein said porous sintered body contains (i) an amount of 40 to 70% by weight based on total weight of said partially stabilized zirconia; and (ii) said nickel in the form of nickel oxide.

17. A method as claimed in claim 15, wherein said partially stabilized zirconia contains magnesia in an amount of 7 to 10% by mole.

* * * * *